INVENTORS
Edward John Humber
John Arthur Ryland

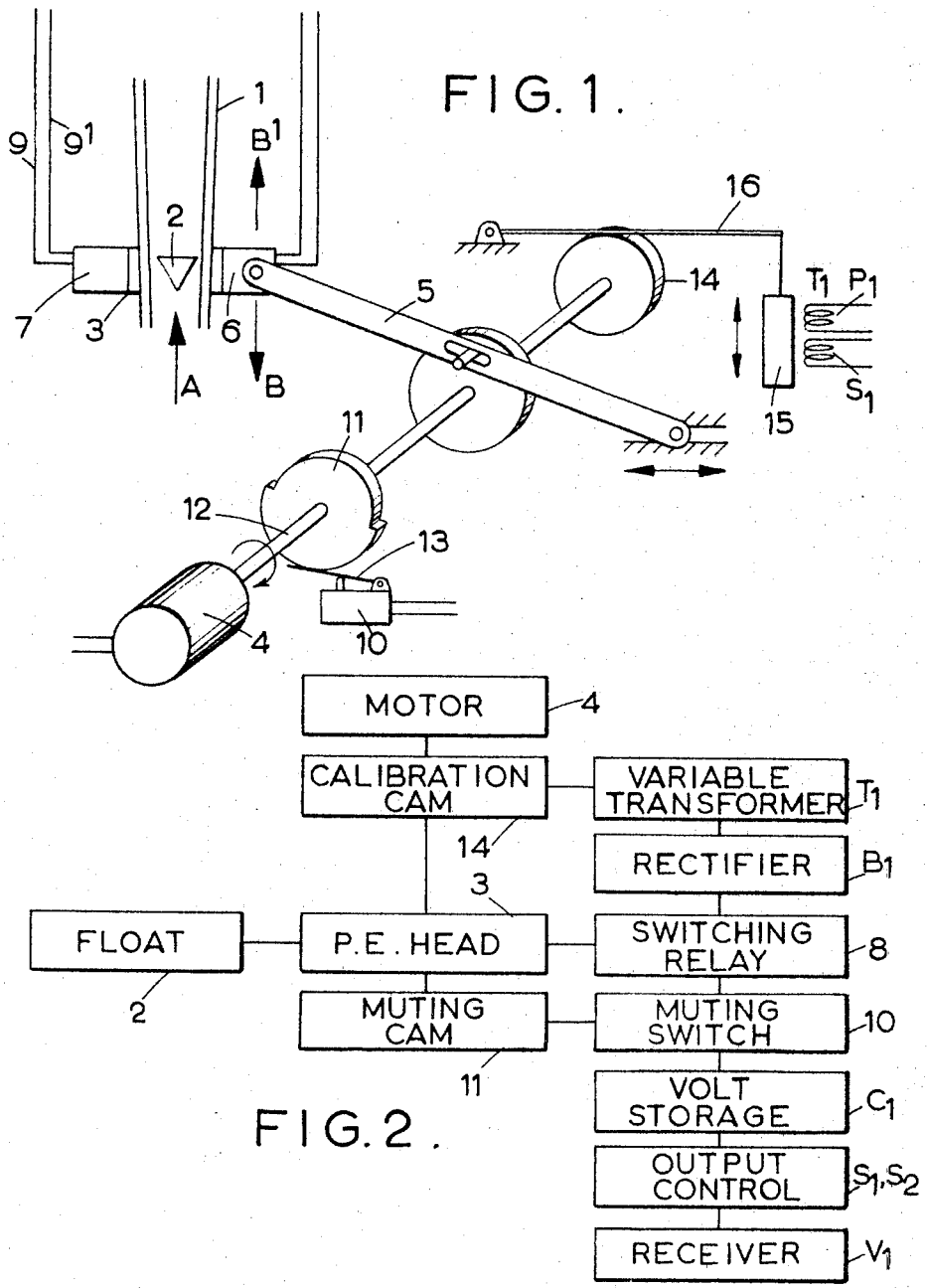

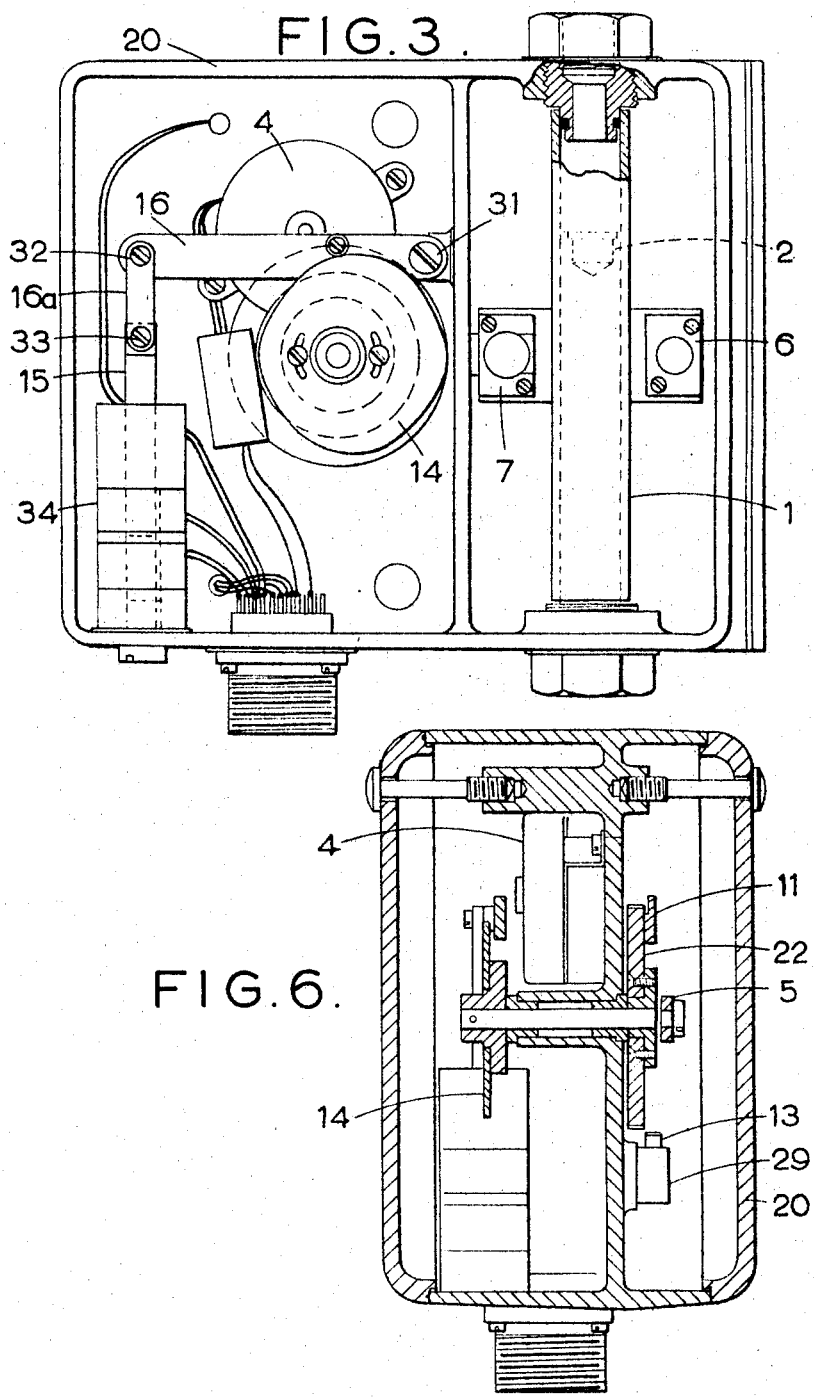

Sparrow and Sparrow
ATTORNEYS

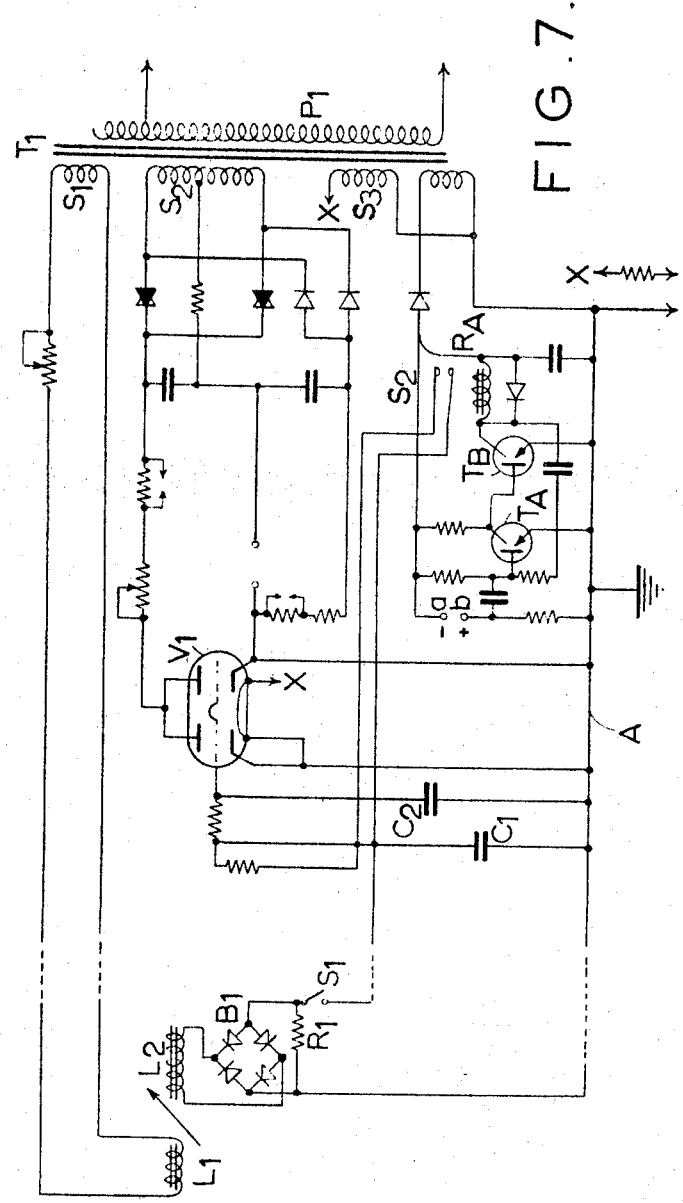

United States Patent Office 3,404,568
Patented Oct. 8, 1968

3,404,568
SCANNING TRANSDUCING MECHANISM
Edward John Humber, Worcester, and John Arthur Ryland, Croydon, England, assignors to Radiovisor Parent Limited, London, and G. A. Platon Limited, Croydon, England
Filed Aug. 17, 1965, Ser. No. 480,389
Claims priority, application Great Britain, Aug. 26, 1964, 21,789/64
16 Claims. (Cl. 73—209)

ABSTRACT OF THE DISCLOSURE

Apparatus for the production of electrical signals indicative of the magnitude of a measured variable indicated by the position of a solid member movable between certain limits. Detection means scans between said limits, which means is such as to produce a distinctive indication whenever the member is detected. An electrical signal is produced whose magnitude changes in accordance with the position of the detection means. Indicator means responsive to the electrical signal only when the distinctive indication is produced, providing an indication of the position of the solid member with respect to the aforementioned limits.

This invention relates to apparatus for the production of signals indicative of the magnitude or other characteristic of a measured variable.

A typical application of the invention is in the field of fluid flowmeters of the variable area type, and the invention will be described with particular reference to such an application, although the invention is in no way limited to the field of flowmeters.

A common form of variable area flowmeter comprises a movable member, hereinafter referred to as a float, or bobbin, located within a vertical pipe section so shaped internally that the area of the flow channel increases as the float or bobbin is forced upward by the flowing fluid. The float or bobbin rises to a height at which equilibrium is reached between gravitational and flow forces and this height is a measure of the rate of flow of the fluid.

It is an object of the invention to provide means whereby the position of the float at any instant, is utilised to provide an indication of the rate of flow of fluid. The apparatus may equally well be applied to metering devices such as are used for level or temperature measurement and to other measuring devices using the displacement of a solid member or pointer as indicating means.

A more general object of the invention is to provide apparatus for detecting the position of a device movably responsive to a measured variable whereby electrical signals indicative of the magnitude or other characteristic of the variable, are produced.

In the field of flowmeters, for small gas flows, the froces acting on the float may be extremely small and means for detecting the position of the float and for producing electrical signals indicative thereof must necessarily operate entirely without reaction upon the float.

A further object of the invention is to provide transducer means for the detection of the position of a device movably responsive to said variable, which means imposes no force or restriction on the device.

According to the present invention there is provided apparatus for the production of electrical signals indicative of the magnitude of a measured variable indicated by the position of a solid member movable between certain limits comprising detection apparatus associated with said member, driving means for causing said detection apparatus to scan between said limits, said detection apparatus being such as to produce a distinctive indication whenever the member is detected, means for producing an electrical signal whose magnitude changes in accordance with the position of the detection apparatus, and indicator means responsive to said electrical signal only when said distinctive indication is produced to provide an indication of the position of the solid member with respect to said limits.

The constructional features of a preferred embodiment of the invention will now be described by way of example only with particular reference to the accompanying drawings wherein:

FIGURE 1 is a diagrammatic representation of the apparatus for scanning the position of a float or bobbin of a variable area flowmeter and for producing signals indicative of the result of the scan;

FIGURE 2 is a schematic block diagram of the scanning mechanism and control apparatus;

FIGURE 3 is a front elevation of the scanning mechanism and control apparatus associated with the tube of a variable area flowmeter;

FIGURE 6 is an end elevation thereof and

FIGURE 7 is a circuit diagram showing the manner in which output signals from the scanning mechanism are utilised to provide an indication of the rate of flow of fluid through the flowmeter.

Figure 4:
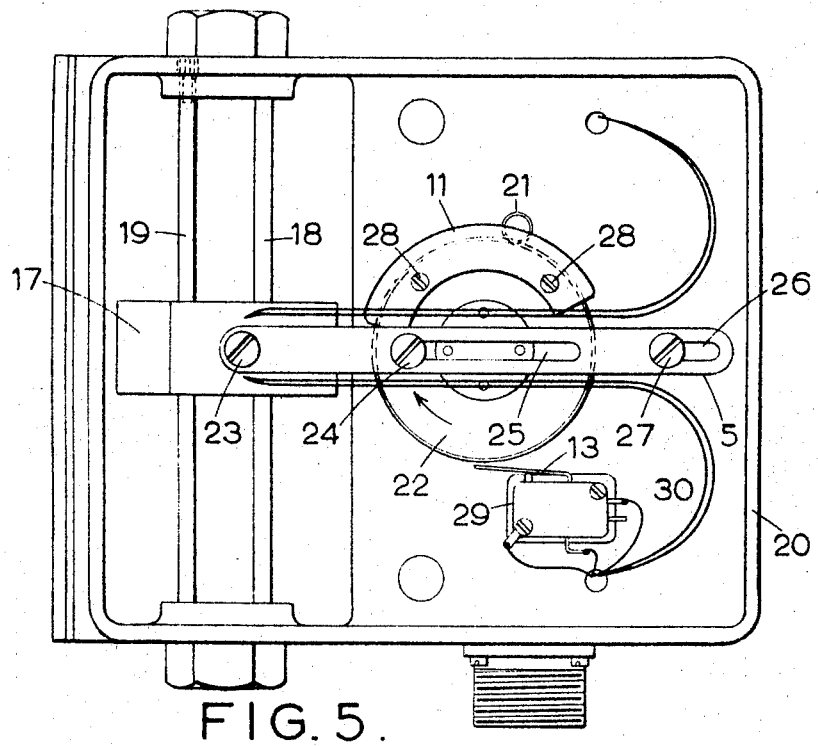
FIGURE 4 is a rear elevation of the scanning mechanism and control apparatus.
Figure 5:
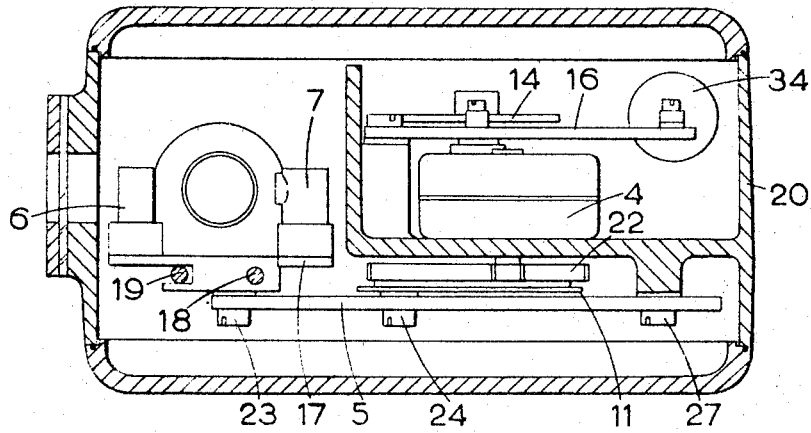
FIGURE 5 is a top view of the scanning mechanism and control apparatus.

The invention will be described by way of example only with particular reference to a variable area flowmeter and photoelectric method of detecting the float position to give electrical output signals, the magnitudes of which are proportional to the rate of fluid flow.

Referring to the schematic diagram of FIGURE 1, the tapered tube 1 of the flowmeter, containing the float 2, has associated therewith, a movable scanning head 3 which is arranged to move up and down the length of the tube 1, the reciprocatory movement being imparted to the scanning head 3, by means of a synchronous motor 4 and a connecting link 5. The direction of fluid flow is indicated in FIGURE 1 by arrow A and the reciprocatory motion of the scanning head is indicated by arrows B, B'. The scanning head 3 comprises a light source 6 located on one side of the tapered tube 1, and a photocell 7 located on the opposite side of the tube 1, which is of glass or other light transmitting material. Thus, the light from the source 6 normally energises the photocell 7 but is obscured or partially obscured whenever the float 2 is located between the light source 6 and the cell 7. Whenever the float is not located intermediate the light source 6 and the cell 7, the output of the cell is utilised, after suitable amplification, to energise the coil of a sensing relay 8, via lines 9, 9', the relay having associated contacts, which are normally open but closed upon deenergisation of the relay 8, i.e. when detection of the float 2 occurs.

In the preferred embodiment of the invention, a muting switch 10 is used to render the photoelectric scanning mechanism inoperative on the down stroke of the scanning head 3. A muting switch cam 11, mounted on the output shaft 12 of motor 4 and driven thereby, has a profile such as to close the muting switch contacts 13, only on the upstroke of the scanning head 3.

The sensing switch contacts and the muting switch contacts 13 are connected in the secondary winding circuit of a transformer $T_1$, the primary winding $P_1$ being connected across a suitable AC voltage source, the contacts being connected in series with a capacitor for a purpose hereinafter defined.

A calibration cam 14 is mounted on the output shaft 12 of motor 4, and controls the movement and position of an iron core 15 with respect to the primary and secondary windings $P_1$, $S_1$, of the transforme $T_1$, via linkage 16, cam 14 having a profile such as to relate proportionally, the position of the said core 15 with the position of the scanning head 3, despite the different extents of their movements.

It will be seen that whenever the beam of light from the light source 6 is obscured by the float 2, it is required to produce an output signal indicative of the position of the float 2 and thus of the rate of fluid flow. The magnitude of the voltage across the secondary winding $S_1$ of the transformer $T_1$, will be seen to be dependent upon the position of the iron core 15 within the transformer windings, which in turn depends upon the position of the scanning head 3. If the beam of light from the light source 6 is obscured when the float 2 is at the bottom of the tube, i.e. the area of the annulus surrounding the float 2 is a minimum, the iron core 15 is arranged to be entirely within the transformer giving a maximum voltage condition in the secondary winding thereof and corresponding to a minimum rate of fluid flow. Similarly, the minimum voltage is obtained with the float 2 at the top of tube 1—the iron core 15 being arranged to be withdrawn almost entirely from the transformer $T_1$ with the minimum voltage in the secondary winding $S_1$ corresponding to a maximum area of annulus and maximum rate of fluid flow.

As previously indicated, the sensing and muting contacts are both connected in the secondary winding circuit of the transformer $T_1$ and in series with a capacitor preferably of the paper wound type. Only when both sets of contacts are closed will any voltage across the secondary winding be applied to the capacitor, the two sets of switches being closed only when the light impinging on the photocell 7 is cut-off or reduced, on the up-stroke of the scanning head 3. The capacitor holds the voltage impressed on it from the transformer and this voltage is applied to the grid of valve $V_1$ of a valve voltmeter such that a meter indication may be provided of the magnitude of the voltage and thus of the rate of fluid flow through the tube 1 of the flowmeter.

Details of the scanning mechanism and control apparatus will now be described with particular reference to FIGURES 3, 4, 5 and 6 of the accompanying drawing. Referring particularly to FIGURE 4, the tube 1 is provided with scale graduations (not shown) and linearisation of the scale may be effected by suitable alteration of the profile of the cam 14 controlling the position of the iron core 15 within the primary and secondary windings of transformer $T_1$. The light source 6 and photocell 7 are mounted on a slider 17 arranged to slide up and down a pair of vertical, parallel rails 18, 19, to effect scanning of the float 2 of tube 1. The reciprocatory motion of the slider 17 is imparted thereto by motor 4, mounted within a housing 20, the output shaft 12 of the motor having keyed thereon, a small toothed pinion 21 arranged in mesh with a larger toothed pinion 22. A slotted connecting link 5 is fixed at one end thereof to the slider 17 by means of screw 23, a further screw 24 passing through a slot 25 in the link 5 and being secured to the larger pinion 22, such as to rotate therewith. The other end of link 5 is slotted as shown at 26 and a further screw 27 passes through slot 26 and is secured to the casing 20 such as to allow a limited sliding movement of the said other end of the link 5. Thus, when the synchronous motor 4, is energized, rotation thereof effects rotation of pinion 22 via smaller pinion 21 to cause link 5 to trace out an oscillatory path and effect reciprocatory movement of slider 17 coupled thereto.

The muting cam 11 is pinned to the pinion 22 by means of screws 28, such as to rotate therewith an effect closure of contact 13 of muting switch 29, mounted on casing 20 by means of screws 30.

The calibration cam 14 is shown in FIGURE 3 and is coupled to pinion 22 such as to rotate therewith. Link 16 is pivoted to the casing 20 by means of pivot pin 31 and coupled by means of pin 32 to one end of link 16a, the other end of which is connected by means of pin 33, to the iron core 15 reciprocable within transformer $T_1$, the casing of which is shown at 34. The magnitude of the voltage across the secondary winding of the transformer $T_1$, will be dependent upon the position of the iron core 15 with respect to the transformer windings, which in turn is determined by the position of the scanning head.

The salient features only of a circuit for applying the voltage across a secondary winding $S_1$ of transformer $T_1$, to a control grid of a valve voltmeter will now be described with reference to FIGURE 7.

As previously described, the voltage across the secondary winding $S_1$ of transformer $T_1$ is variable and is dependent upon the position of the iron core 15 with respect to the transformer primary and secondary windings. Primary winding $P_1$ of transformer $T_1$ is connected to a stablished AC voltage source. A first secondary winding $S_1$ is connected to coupled inductance coils $L_1$, $L_2$, the latter being connected across the input of a full-wave rectifier bridge $B_1$, having a 120K ohm resistor $R_1$ connected across the output terminals thereof. The DC output circuit from the rectifier $B_1$ includes switch contact $S_1$ which is the contact arranged to be actuated by rotation of muting switch cam 11; switch contact $S_1$ being closed only during the up-stroke of the scanning mechanism.

The photocelle 7 is connected to terminals a, b, and the output therefrom amplified in transistor amplifiers $T_A$, $T_B$, the latter having the collector thereof connected to relay coil $R_A$ and the associated relay contacts $S_2$ being connected in series with switch contact $S_1$. Relay $R_A$ and associated contacts $S_2$ preferably constitute a Reed type magnetic switch. As shown in FIGURE 7, a capacitor $C_1$, preferably of the paper wound type, is connected in series with switch contacts $S_1$, $S_2$, and between earthed conductor A and one grid of a double triode valve $V_1$. The arrangement is such that whenever muting cam switch contact $S_1$ is closed during the up-stroke of the scanning mechanism and whenever switch contacts $S_2$ are closed in response to de-energisation of relay $R_A$ following detection of float 2, the voltage across secondary winding $S_1$, having a magnitude corresponding to the position of the iron core 15 with respect to the transformer windings, and thus of the position of the scanning mechanism at the moment of detection, is applied to capacitor $C_1$. The voltage impressed on capacitor $C_1$ will be applied to the grid of valve $V_1$ which may be part of a valve voltmeter such that a direct indication of the rate of flow through the flowmeter is provided in accordance with the magnitude of the voltage applied to the grid. A further capacitor $C_2$ is connected between the grid of valve $V_1$ and earthed line A and current for valve $V_1$ being derived from tapped secondary winding $S_2$ of transformer $T_1$. A further secondary winding $S_3$ provides the current for the lamp constituting the light source 6 of the scanning mechanism and for the filaments of valve $V_1$ as indicated at X.

The photoelectric method of detection is particularly applicable to flowmeters having low mass floats since no force is imposed on the float. However, any other form of transducer may be used and for larger floats, a magnet may be incorporated in the float and used to operate a magnetically operated switch, e.g. a Reed switch.

It will be appreciated that the invention is susceptible of considerable modification and is not to be deemed limited to the particular features described by way of example only. The apparatus has considerable flexibility since the output from the secondary winding may be arranged to give an indication of any required characteristic of a variable, by alteration of the profile of the cam controlling the position of the iron core of the transformer.

The invention is capable of unlimited application. Not only will it provide a remote indication of the rate of flow of fluids, but it may be used to provide integration rates of flow to give a total summation thereof, Rates of flow over a period may be recorded graphically or the information obtained may be used to feed a servo control system.

What is claimed is:

1. Apparatus for the production of electrical signals indicative of the magnitude of a measured variable indicated by the position of a solid member movable between certain limits comprising detection apparatus associated with said member, driving means for causing said detection apparatus to scan between said limits, said detection apparatus being such as to produce a distinctive indication whenever the member is detected, means for producing an electrical signal whose magnitude changes in accordance with the position of the detection apparatus, indicator means responsive to said electrical signal only when said distinctive indication is produced to provide an indication of the position of the solid member with respect to said limits, said driving means comprising a driving motor having a cam member mounted on the output shaft thereof, a transformer having a primary winding, a secondary winding and an iron core, said cam member being coupled to said iron core, said primary winding being connected to a voltage source such that the voltage across said secondary winding varies in accordance with the position of said core with respect to said windings, and the position of said iron core varying in accordance with the position of said detection apparatus.

2. Apparatus for the production of electrical signals indicative of the magnitude of a measured variable indicated by the position of a solid member movable between certain limits comprising detection apparatus associated with said member, driving means for causing said detection apparatus to scan between said limits, said detection apparatus being such as to produce a distinctive indication whenever the member is detected, means for producing an electrical signal whose magnitude changes in accordance with the position of the detection apparatus, indicator means responsive to said electrical signal only when said distinctive indication is produced to provide an indication of the position of the solid member with respect to said limits, said detection apparatus comprising a light source located on one side of said solid member and a photocell located on the opposite side thereof such that whenever said solid member is located intermediate said source and said photocell, no output is produced by said detection apparatus, electrical relay means being normally energized in response to the output from said photocell and having associated normally open contacts such that whenever said solid member is detected, and said relay means is de-energized to close said associated contacts.

3. Apparatus as calimed in claim 1 wherein said relay contacts are connected in the secondary winding circuit of the transformer.

4. Apparatus as claimed in claim 3 wherein said output shaft of said driving motor is coupled through linkage mechanism to said detection apparatus to impart reciprocatory motion thereto, a further cam member being mounted on said output shaft and arranged to coact with associated switch contacts during half the scan of said detection apparatus such as to render said apparatus operative only during the other half of the scan, the relay contacts and the switch contacts being connected in the secondary winding circuit of said transformer and in series with capacitance means such that whenever detection of the solid member occurs during the operative part of the scan said voltage across the secondary winding of the transformer is applied to the capacitor.

5. Apparatus as claimed in claim 1, wherein said solid member is float means of a variable area type flowmeter and is located within a tapered tube thereof, said detection apparatus being mounted for reciprocatory motion up and down said tube to effect scanning of said float means, the detection apparatus being such that an output signal is produced therefrom except when detection of said float means occurs.

6. Apparatus as claimed in claim 4 wherein said capacitance means is connected in circuit with said indicator means such that whenever the voltage across said secondary winding of the transformer is applied to said capacitance means and discharge thereof occurs, said indicator means provides an indication of magnitude of the voltage across said secondary winding and thus of the measured variable.

7. Apparatus as claimed in claim 5 wherein said indicator means provides a direct indication of the rate of fluid flow through said flowmeter.

8. Apparatus as claimed in claim 6 wherein said indicator means comprises a valve voltmeter.

9. Apparatus according to claim 1 wherein said detection apparatus includes a light source located on one side of said solid member and a photocell located on the opposite side thereof such that whenever said solid member is located intermediate said source and said photocell, no output is produced by said detection apparatus, electrical relay means being normally energised in response to the output from said photocell and having associated normally open contacts such that whenever said solid member is detected, said relay means is de-energised to close said associated contacts.

10. Apparatus as claimed in claim 2 wherein said relay contacts are connected in the secondary winding circuit of the transformer.

11. Apparatus as claimed in claim 2 wherein said output shaft of said driving motor is coupled through linkage mechanism to said detection apparatus to impart reciprocatory motion thereto, a further cam member being mounted on said output shaft and arranged to coact with associated switch contacts during half the scan of said detection apparatus such as to render said apparatus operative only during the other half of the scan, the relay contacts and the switch contacts being connected in the secondary winding circuit of said transformer and in series with capacitance means such that whenever detection of the solid member occurs during the operative part of the scan the voltage across said secondary winding of the transformer is applied to the capacitor.

12. Apparatus as claimed in claim 2 wherein said solid member is float means of a variable area type flowmeter and is located within a tapered tube thereof, said detection apparatus being mounted for reciprocatory motion up and down said tube to effect scanning of said float means, the detection apparatus being such that an output signal is produced therefrom except when detection of said float means occurs.

13. Apparatus as claimed in claim 3 wherein said solid member is float means of a variable area type flowmeter and is located within a tapered tube thereof, said detection apparatus being mounted for reciprocatory motion up and down said tube to effect scanning of said float means, the detection apparatus being such that an output signal is produced therefrom except when detection of said float means occurs.

14. Apparatus as claimed in claim 4 wherein said solid member is float means of a variable area type flowmeter and is located within a tapered tube thereof, said detection apparatus being mounted for reciprocatory motion up and down said tube to effect scanning of said float means, the detection apparatus being such that an output signal is produced therefrom except when detection of said float means occurs.

15. Apparatus as claimed in claim 6 wherein said indicator means provides a direct indication of the rate of fluid flow through said flowmeter.

16. Apparatus as claimed in claim 7 wherein said indicator means comprises a valve voltmeter.

References Cited

UNITED STATES PATENTS

| | | |
|---|---|---|
| 2,091,303 | 8/1937 | Brelsford. |
| 2,715,705 | 8/1955 | Barstow et al. 73—209 X |
| 2,841,011 | 7/1958 | Mayes et al. 73—401 |
| 2,921,469 | 1/1960 | Newton 73—401 X |
| 3,094,214 | 6/1963 | Wyman et al. 88—14 X |
| 3,220,250 | 11/1965 | Strandquist et al. 73—95 |

RICHARD C. QUEISSER, *Primary Examiner.*

E. D. GILHOOLY, *Assistant Examiner.*